Nov. 6, 1928.

W. R. HUME 1,690,489

AUTOMATIC CONTROL DEVICE FOR ELECTRIC ARC WELDING APPARATUS

Original Filed Sept. 21, 1925

Inventor:
Walter Reginald Hume
By
Attorney.

Patented Nov. 6, 1928.

1,690,489

UNITED STATES PATENT OFFICE.

WALTER REGINALD HUME, OF MELBOURNE, AUSTRALIA.

AUTOMATIC CONTROL DEVICE FOR ELECTRIC-ARC WELDING APPARATUS.

Original application filed September 21, 1925, Serial No. 57,744, and in Australia October 9, 1924. Divided and this application filed December 22, 1927. Serial No. 241,921.

This invention relates to automatic arc welding machines the successful operation of which relies to a great extent upon the accurate control of the arc length, that is, the distance between the electrode point and the work. Such automatic arc welding machines have hitherto possessed objections which have limited their use, these objections being chiefly due to the intricate and delicate nature of the devices for adjusting and controlling the arc length, which devices being unreliable in operation, have frequently caused defective welding. For such reason electric arc welding is largely carried out by hand manipulation of the electrode, but such hand control of the arc length, even with a highly skilled operator, lacks the continuity and uniformity essential to the production of a perfect weld, and resulting imperfections render the work defective and in many cases useless.

The difficulty in maintaining the correct arc length throughout the welding process is due principally to the fact that a crater or cavity of continually varying depth is formed beneath the electrode point, whilst on the other hand the electrode is continually forming or casting off particles of molten metal with the result that the arc length continually varies and the voltage and amperage of the current across the arc is subject to constant momentary changes between the permissible extremes of maximum and minimum.

In order to overcome the above difficulties I have devised and described in my co-pending United States application Serial No. 57744, filed September 21, 1925, of which this application is a division, apparatus wherein an electric motor, which is preferably series wound and directly connected across the terminals of the welding arc, is arranged to operate a centrifugal governor so that as the motor speed fluctuates or varies in accordance with fluctuations or variations in the current voltage across the arc, this varying rotary motion of the motor is converted into a correspondingly varying reciprocatory motion of the governor which is in turn applied to the operation of a fluid control valve which controls a fluid operated electrode feeding mechanism.

The primary object of the present invention is to apply the above-mentioned electric motor-centrifugal governor combination to the control of an electrically driven electrode feeding mechanism in lieu of the fluid operated electrode feeding mechanism above mentioned. To this end the centrifugal governor is adapted to operate a rheostat or variable resistance which controls the supply of current to a second electric motor by which the electrode feeding mechanism is driven.

Referring to the drawings which form part of this specification:

Figure 2:
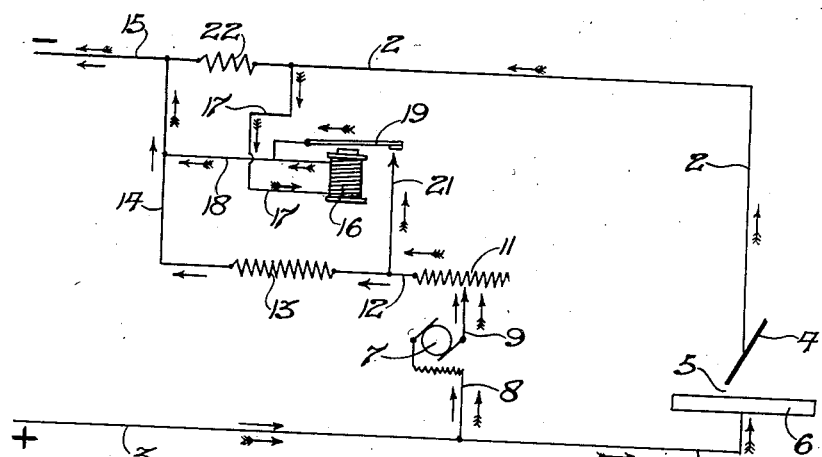
Figure 2 is a wiring diagram showing a suitable method of connecting into the arc welding circuit the control motor which operates the centrifugal governor as aforesaid.

Referring more particularly to Figure 2, the reference numerals 2 and 3 indicate conductors which are connected to the electrode 4 and the work 6 respectively, the location of the welding arc being indicated at 5. The numeral 7 indicates a series wound electrode feed control motor, which is directly connected across the arc 5 by a conductor 8 connected to the conductor 3, whilst a conductor 9 leads from the armature of the motor. This conductor 9 may be connected to a manually adjustable rheostat or resistance 11 whereby the mean speed of the motor may be manually controlled apart from the influence of fluctuations in the welding arc circuit as aforesaid. By manipulation of this rheostat or resistance 11 the electrode feed control may be adjusted to meet greater or lesser demands for the fusing of the electrode in accordance with the predetermined current amperage employed, that is to say that as the amperage is increased so the amount of fusion becomes greater and the speed of the motor 7 must be increased to meet the greater demand for electrode. By the employment of a manually operated rheostat or resistance as above mentioned, this speed of the motor may be regulated or set according to requirements quite apart from the automatic control of the feeding speed which is provided in accordance with the variations in voltage at the arc as aforesaid.

The manually adjustable rheostat or resistance 11 may be connected by a conductor 12 to a fixed resistance 13 from which a conductor 14 leads to a conductor 15 which latter with the conductor 3 is connected with a suitable source of electric power.

A by-pass circuit controlling a relay magnet 16 is incorporated with the foregoing to divert portion of the current from the main arc welding circuit through motor 7 when the arc has been struck. Accordingly a conductor 17 may be connected between one terminal of the relay coil and the conductor 2 whilst a conductor 18 extends between the other terminal of the relay and the conductor 14. The conductor 18 is connected to the armature 19 of the relay 16, and, upon the latter being energized by the initiation or striking of the arc at 5, the armature 19 closes a circuit through a by-pass conductor 21, which is connected to the conductor 12.

A fixed resistance 22 may be interposed in the conductor 2 between the points of connection thereto of the conductors 14 and 17 so as to divert the current from conductor 2 to the relay 16 when the welding circuit is closed by the striking of the arc.

Prior to the striking or initiation of the arc, the current flows by way of conductors 3 and 8 through the series wound motor 7, thence by way of conductor 9 through the variable resistance 11, which is adjusted to give the desired mean operating speed of the motor. From this resistance 11 the current passes through conductor 12, fixed resistance 13 and conductor 14 to the return or negative conductor 15 as indicated by the plain or unbarbed arrows in Figure 2.

When the arc 5 is struck the current, diverted by the resistance 13, flows between the arc terminals formed by the work 6 and electrode 4 to the conductor 2, thence through the electromagnet or relay 16 and conductor 18 to the return lead 15. This causes the relay 16 to be energized, thus closing its armature 19 so that portion of the current passes through the by-pass conductor 21, the adjustable resistance 11 and the control motor 7 from the conductor 3, the resistance 13 preventing the current from taking circuit through the conductor 14 to the return lead 15.

To ensure a sensitive and effective control of the electrode feed, the controlling motor 7 is utilized not to drive the electrode feeding mechanism, but solely to govern or regulate the working speed thereof according to fluctuations in the arc length. For this purpose a motor 7 of relatively low power and weight and of accordingly greater sensitiveness may be employed, such relatively small motor being preferably series wound and directly connected across the terminals of the welding arc as aforesaid.

Figure 1:
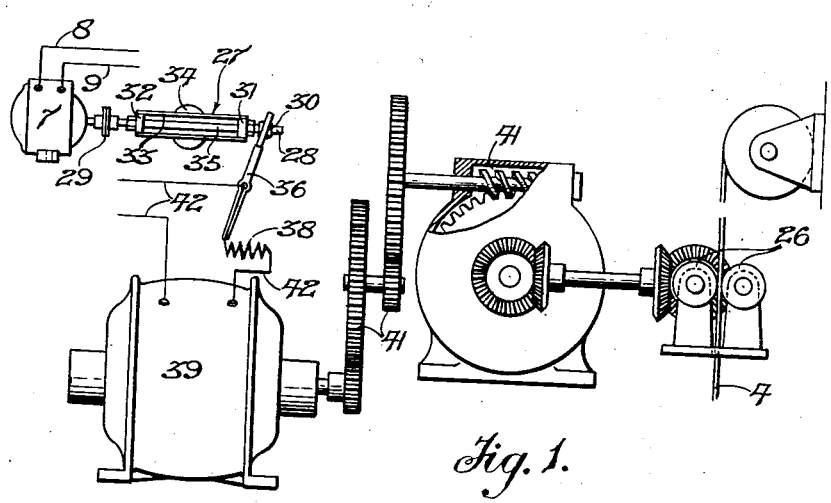
Figure 1 shows the invention applied to the control of a suitable electrode feeding mechanism.

In conjunction with the motor 7, I employ a centrifugal governor indicated in general at 27 in Figure 1. The spindle 28 of this governor is coupled as at 29 to the spindle of the motor 7 and the reciprocatory collar or member 31 of the governor may be flexibly connected to a fixed collar or the like 32 by suitable means such as spring arms 33 bearing the usual weights 34 intermediately of their length. A sleeve 35 movable with the reciprocatory collar 31 may encircle the governor spindle 28 as shown in order to limit the inward travel of said collar 31.

The reciprocatory member 31 of the governor is loosely connected as at 30 to an operating member such as a lever 36 whereby the reciprocatory motion of the member 31, incidental to speed variations of the motor 7, due to fluctuations in the arc length, is transmitted to an associated regulating device for controlling the operation of the electrode feeding mechanism. As seen in Figure 1 this regulator consists of a rheostat or variable resistance 38, which, through the governor operated lever 36, regulates the supply of current to a separate and larger electric motor 39. This latter motor may be connected into an independent electrical circuit, indicated at 42, and is adapted to drive a suitable electrode feeding mechanism, as for instance by actuating the feed rollers 26 through the medium of suitable reduction gear indicated generally by the numeral 41.

It will be evident that by employing a separate or independent feed motor as at 39, to operate the electrode feeding mechanism, such feed motor being controlled by the governor 27 and the controlling motor 7 which is incorporated in the welding arc circuit as aforesaid, an extremely sensitive automatic control in accordance with current fluctuations in the welding circuit will be obtained thus ensuring that the proper amount of electrode is fed forwardly in accordance with requirements at the arc.

Having now described my invention what I claim as new and desire to secure by Letters Patent is:—

1. In electric arc welding apparatus the combination of an electric motor connected into the welding circuit, a centrifugal governor operated by said motor, an electrode feeding mechanism, a second electric motor adapted to drive said feeding mechanism, means for regulating the supply of current to the last named motor, and means interposed between said governor and said regulating means for communicating to the latter the movements produced by the governor in accordance with fluctuations in the current passing through the first named motor, for the purpose specified.

2. In electric arc welding apparatus the combination of an electric motor connected into the welding circuit, a centrifugal governor operated by said motor, an electrode feeding mechanism, a second electric motor adapted to operate said electrode feeding means, a regulator comprising a rheostat or variable resistance adapted to regulate the supply of current to the last named motor, and means operatively connecting said governor and regulator for operating the latter in accordance with fluctuations in the current passing through the first named motor, for the purpose specified.

3. In electric arc welding apparatus the combination of an electric motor connected into the welding circuit, a centrifugal governor operated by said motor, an electrode feeding mechanism, a second electric motor adapted to drive said electrode feeding mechanism, a regulator comprising a rheostat or variable resistance adapted to regulate the supply of current to the last named motor, and an arm or lever interposed between said governor and regulator for communicating to the latter the movements produced by the governor in accordance with fluctuations in the current passing through the first named motor, for the purpose specified.

4. In electric arc welding apparatus the combination of a series wound feed control motor directly connected across the terminals of the welding arc, a centrifugal governor operated by said motor, an electrode feeding mechanism, a second electric motor adapted to drive said electrode feeding mechanism, a regulator comprising a rheostat or variable resistance adapted to regulate the supply of current to the last named motor, and means interposed between said governor and regulator for operating the latter in accordance with fluctuations in the current passing through the first named motor without altering the direction of the electrode feed for the purpose specified.

5. In electric arc welding apparatus the combination of a series wound feed control motor directly connected across the terminals of the welding arc, a centrifugal governor operated by said motor, an electrode feeding mechanism, a second electric motor adapted to drive said electrode feeding mechanism, a regulator comprising a rheostat or variable resistance adapted to regulate the supply of current to the last named motor, and an arm or lever interposed between said governor and regulator for communicating to the latter the movements produced by the governor in accordance with fluctuations in the current passing through the first named motor, for the purpose specified.

In testimony whereof I affix my signature.

WALTER REGINALD HUME.